United States Patent [19]

Dallet

[11] 4,275,657
[45] Jun. 30, 1981

[54] SPIRALLY WOUND PYROTECHNIC CHARGE USEFUL FOR THE PROPULSION OF AN ENGINE AND THE LIKE

[75] Inventor: Francis A. Dallet, Tresses, France

[73] Assignee: Societe Nationale des Poudres et Explosifs, Paris, France

[21] Appl. No.: 859,825

[22] Filed: Dec. 12, 1977

[30] Foreign Application Priority Data

Dec. 30, 1976 [FR] France .................. 76 39522
Apr. 20, 1977 [FR] France .................. 77 11939

[51] Int. Cl.$^2$ ............................................. F42B 1/00
[52] U.S. Cl. .................................. 102/531; 60/255; 102/284
[58] Field of Search ............... 102/39, 38, 99–103; 156/552; 60/254, 255, 256

[56] References Cited

U.S. PATENT DOCUMENTS

| 694,295 | 2/1902 | Maxim | 102/100 |
|---|---|---|---|
| 2,605,607 | 8/1952 | Hickman | 60/255 |
| 2,949,854 | 8/1960 | Stewart | 102/39 |
| 3,159,104 | 12/1964 | Hodgson | 102/102 X |
| 3,167,912 | 2/1965 | Ledwith | 60/232 |
| 3,271,215 | 9/1966 | Hoffman | 156/552 |
| 3,307,997 | 3/1967 | Detrick | 102/99 X |
| 3,364,809 | 1/1968 | Hinderer | 102/99 X |
| 3,429,264 | 2/1969 | Oversohl et al. | 102/100 |
| 3,496,870 | 2/1970 | Fulner | 102/103 |
| 3,713,395 | 1/1973 | Carpenter | 102/103 |
| 3,898,934 | 8/1975 | Mercier et al. | 60/255 |
| 3,943,856 | 3/1976 | Ramont et al. | 102/39 |

FOREIGN PATENT DOCUMENTS 1483473 6/1967 France ....................... 102/99

*Primary Examiner*—Harold J. Tudor
*Attorney, Agent, or Firm*—Bucknam and Archer

[57] ABSTRACT

A pyrotechnic charge for generating gases, for example for the propulsion of an engine, comprising elongate strands of propellant fixed, such as by adhesive or mechanical fastening devices, to at least one band of flexible material which is wound into a spiral having several turns so that each strand of propellant is positioned radially between adjacent turns of the band and lies in an axial plane. The flexible band has an inhibiting effect on the combustion characteristics of the strands of propellant.

22 Claims, 15 Drawing Figures

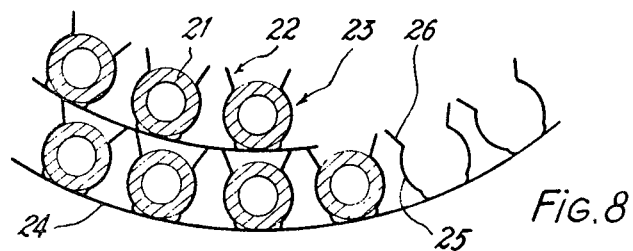
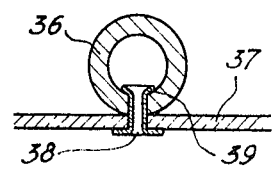
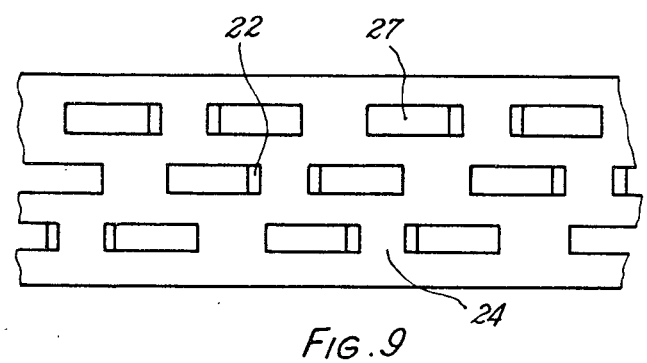
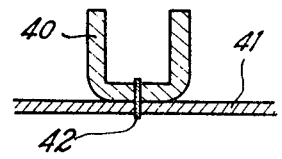
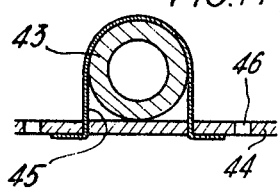
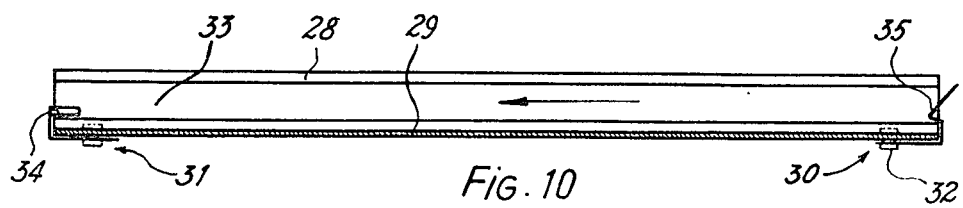
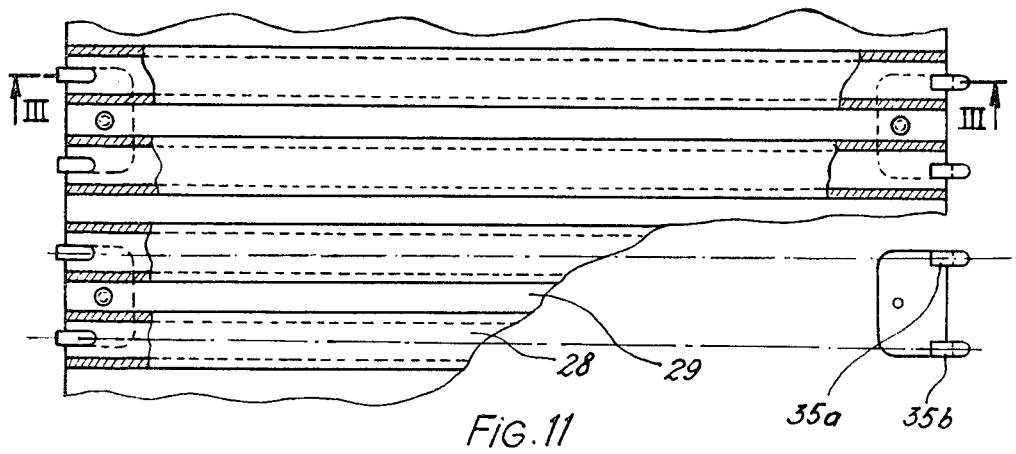

SPIRALLY WOUND PYROTECHNIC CHARGE USEFUL FOR THE PROPULSION OF AN ENGINE AND THE LIKE

The present invention relates to a pyrotechnic charge which is spirally wound and which can be used, for example in the propulsion of an engine, in particular as the accelerating charge of an engine.

Pyrotechnic charges comprising one or more strips of propellant wound in the shape of a spiral are known and described, for example, in U.S. Pat. No. 3,496,870. The main disadvantage of such charges lies in the difficulty of winding the initially flat strips, which is due in particular to the stiffness of the strips of propellant at ambient temperature. Furthermore, if the charge is to generate hot gases at a high rate of discharge, it is necessary to use very thin strips of propellant, even if the strips burn from both their sides. The thin strips are fragile, any breaks affect the combustion characteristics of the charge.

Pyrotechnic charges comprising a multitude of strands of propellant, arranged so as to be parallel to the axis of a combustion chamber, are also known and are described, for example, in French Pat. No. 1,351,422 and its three Certificates of Addition Nos. 82,955, 95,655 and 95,663. The strands are encased at one end in a bed made of plastics material and it is possible with such charges to generate hot gases at a high rate of discharge. However the charges are very fragile when it is necessary to use thin strands of propellant. Numerous subsequent patents have been filed which relate to improvements applicable to this type of charge, generally referred to as "brush charges", in order to try and reduce the fragility of the charge and render their manufacture easier. Thus, it has been proposed to off-set the fixing bed, or to use a composite bed, the strands being encased in a flexible substance which is firmly fixed to a rigid material. It has also been proposed to run a destructible inhibiting foam between the strands of propellant, to provide a strengthening grid for supporting the free end of the strands, or to glue all the free ends of these strands together. All these improvements reduce the number of strands of propellant which become broken either during handling of the charge or of the engine equipped with the charge, especially when this handling takes place at low temperature, or during the combustion of the charge, and especially when the charge is ignited; however, none of these improvements eliminates breakages completely.

The strands of propellant used in the production of pyrotechnic accelerating charges possess a surface area of combustion which decreases or remains constant during combustion. On the other hand, the free space for flow of the gases formed between the strands of propellant increases during the combustion of the strands of propellant. As a result the space which can be filled, and therefore the number of strands of propellant is restricted due to the phenomena of erosive combustion which occurs when the pyrotechnic charge is ignited.

According to the present invention there is provided a pyrotechnic charge comprising elongate strands of propellant fixed to at least one band of flexible material having several turns extending about a charge axis, each strand of propellant extending in an axial plane and being radially positioned directly between adjacent turns of flexible band material.

A pyrotechnic charge of this form can be sufficiently strong for the strands of propellant not to break, either during handling, or during combustion. The strands of propellant can be identical to those used previously for forming "brush charges". The band or bands which support and position the strands of propellant absorb vibrations and/or impacts. The pyrotechnic charge can also be filled with a greater proportion of material, it being possible to increase the number of strands of given propellant which can be used in a given volume, because the band or bands which support and position the strands of propellant restrict the initial surface area of combustion of each strand, and which therefore reduces the phenomena of erosive combustion. Furthermore, the charges can be manufactured at a very high production rate.

The invention also provides a method of manufacturing a pyrotechnic charge comprising the steps of: positioning strands of propellant parallel to each other; fixing the strands of propellant to a band of flexible material; and winding into a spiral having several turns the flexible band and strands of propellant fixed thereto.

The method of manufacture can be simple and rapid, and can make it possible to stora a charge which has not yet been given its final shape and which is referred to herein as an intermediate charge.

Each flexible band can have an inhibiting nature as regards the combustion characteristics of the strands of propellant, that is to say that the flexible band can be produced either from an inhibiting material such as a plastic, or from a combustible material having a much lower rate of combustion than the rate of combustion of the propellant or propellants, constituting the strands fixed to this band. The strands are fixed sufficiently firmly to ensure that they are held in position during their combustion. Furthermore, if the or each flexible band has an inhibiting nature, fixing of the strands of propellant to the bands, for example by gluing, has the effect of bringing about partial inhibition of these strands, and this creates zones of progressive combustion which make it possible to reduce the phenomena of erosive combustion.

The strands of propellant can be fixed to the band(s) by gluing. Alternatively, the strands of propellant can be fixed to the flexible band by means of mechanical elements which can be either protuberances on the flexible band, or separate components which are attached to the band. In either case the elements preferably form at least one clip for holding each strand of propellant, it being possible for this clip to be positioned either laterally, or longitudinally, relative to the strand of propellant held by this clip. This particular method of fixing is suitable whatever may be the thickness of the propellant strands to be combusted, and it is particularly suitable for fixing strands having an annular or cruciform cross-section with laterally disposed clips, as well as for fixing with longitudinally disposed clips, strands which are tubular or have, in cross-section, the shape of a T or U.

In another form the mechanical fixing elements each includes at least one pin which passes through the band and fits into a perforation in the strand of propellant, the pin having an end which is wider than the perforation so as to hold the strand of propellant flat against the flexible band. It is possible for the end of the pin to be widened before it is inserted into the perforation, so it snaps into the strand or after insertion, like a rivet.

Furthermore the mechanical fixing elements may be fasteners which pass through the flexible band and into or through the strands of propellant, or extend around the strand on the side remote from the band.

The flexible band in a preferred embodiment possesses parallel contours, each contour corresponding to the location of the strand of propellant. Preferably, the flexible band has a constant thickness, and the contours are obtained by undulations in the flexible band, the pitch of the undulations corresponding to the pitch of the strands of propellant.

The flexible band may be provided with perforations for balancing the pressures prevailing at different parts within the charge.

It is possible for the pyrotechnic charge to be wound in the shape of a spiral, but for the pyrotechnic charge to be tubular, for example, for use as an outer charge of a complex propellant assembly, or as a charge for an annular gas generator, such as used in propulsion devices for the acceleration of self-propelled engines, or in recoil-less guns having an expanded combustion chamber.

The flexible band width is preferably less than the length of the strands of propellant. In a preferred embodiment the outermost turn of flexible band material is supported by a supporting device fixed thereto. The supporting device is preferably annular and serves to position the pyrotechnic charge in the combustion chamber of an engine. The supporting device combines with the spiral flexible band to reinforce the absorption effect of the band and thus to increase the strength of the pyrotechnic charge in a combustion chamber.

The supporting device for the charge can be placed in the zone essentially corresponding to the separation of the downstream and upstream propulsive flows produced when the charge is ignited and discharges gases to at least two nozzles located one at either end of the charge. The zone may be situated, for example, halfway along the strands of propellant when the two nozzles are identical. The invention also provides a gas generating device comprising a charge according to the invention and at least one gas exhaust nozzle. Preferably, there are at least two exhaust nozzles situated at either end of the pyrotechnic charge for discharging gases in substantially opposite directions. The exhaust nozzles can be axially aligned, have parallel or intersecting axes or be arranged in any directions. It is possible for the nozzles to be, for example, lateral or tangential to the cylindrical combustion chamber of the gas generator, and to be circular or annular. The different possibilities offered by the pyrotechnic charge according to the invention make it possible to design motors, ammunition and all other engines.

Some embodiments of the invention are described below in detail, by way of example, with reference to the accompanying drawings in which:

FIG. 8 is a partial view, in transverse cross-section, of another charge;

FIG. 9 is a partial view of the lower turn of the charge shown in FIG. 1, on a reduced scale;

FIG. 10 is a cross-section taken along the line III—III, of the charge shown in FIG. 4;

FIG. 11 is a partial plan view of the charge of FIG. 3; and

FIGS. 12 to 14 are detailed views, in transverse cross-section, illustrating different methods of fixing a strand of propellant to a flexible band.

Figure 4:
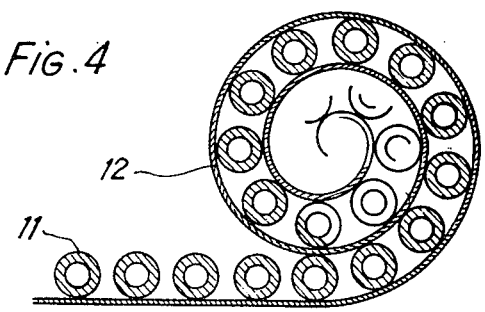
FIG. 4 is a transverse cross-section of a charge during manufacture.

In a first form of charge embodying the invention the strands of propellant are fixed to a single flexible band. The strands of propellant can be fixed to only one side of the flexible band, which is the case shown in FIG. 6, or fixed to both sides of the flexible band, which is the case shown in FIG. 7. The same strand of propellant can be fixed, e.g. by gluing, to both sides of the same flexible band when the latter is wound into a spiral in which case the band must have adhesive capacity on both its sides, the strands of propellant being initially glued to only one side of the band and becoming glued to the other side when the charge is wound into a spiral, as is shown in FIG. 4.

Figure 5:
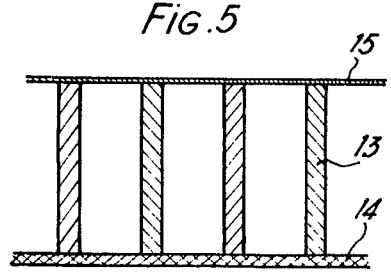
FIG. 5 is a partial cross-section showing a detail of an alternative form of charge.

In a second form of charge embodying the invention the strands of propellant are fixed to two flexible bands which contact each other when the charge is wound into a spiral. A charge of this form is shown in FIG. 5 before being wound into a spiral, the charge including strands of propellant in the form of a thin sheet. Alternative strands of propellant possess at least one concave side and may have the cross-sectional shape of an O, U, X, L, H or the like.

The two forms of charge described can include either strands of propellant of different lengths, for example in order to form a propellant charge in the shape of a truncated cone, or strands of propellant which possess at least two different combustion thicknesses, in particular tubes of the same external diameter but having different internal diameters, in order to produce propellant charges with different decreasing gas discharge rates.

Figure 1:
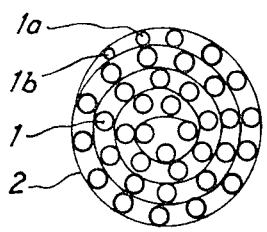
FIG. 1 is a schematic view of a first charge, as seen along a plane perpendicular to the axis of the charge.
Figure 2:
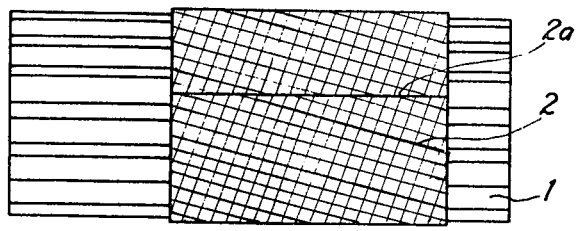
FIG. 2 is a side view of the charge shown in FIG. 1.

The propellant pyrotechnic charge shown in FIGS. 1 and 2 comprises 38 tubular strands 1 made of a two-component propellant, the last two outer strands 1a and 1b having a smaller diameter in order to reduce the eccentricity of the charge and to give it an approximately cylindrical external shape. The strands of propellant are supported on a flexible band 2 which is wound in the shape of a spiral about an imaginary central axis which corresponds to the axis of the circumscribing cylinder. The strands are glued to the flexible band which does not form a regular spiral because each turn rests only on the strands of propellant of the adjacent inner turn, this irregularity being more pronounced at the centre of the charge and when very flexible bands are used, such bands forming a succession of planes tangential to the strands of propellant. The strands of propellant are evenly distributed on the flexible band, with the exception of the end portion of this band which is at the centre of the spiral. The strands have an external diameter of 5 millimeters and an internal diameter of 4 millimeters; the first 4 strands are spaced 8 millimeters apart in order to facilitate winding, whereas all the other strands are spaced 4 millimeters apart. The charge is a simple spiral formed by winding a single layer of strands of propellant which are fixed to a single flexible band which is glued to itself at its outside end 2a. The flexible band is arranged in the medial portion of the strands of propellant and has an axial length which is substantially equal to half the length of the strands, the strands projecting beyond both edges of this band.

Figure 3:
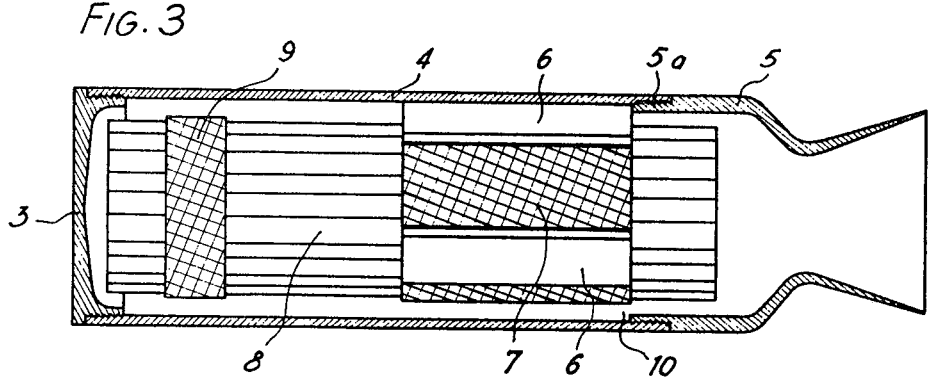
FIG. 3 is a view, in longitudinal cross-section, of a device equipped with a charge embodying the invention.

The acceleration stage of a self-propelled engine, which stage is shown in FIG. 3, comprises a pyrotechnic charge according to the invention which is packed in a propulsion device consisting of a front plate 3 screwed on the end of a shroud 4, the other end of which is screwed to a nozzle 5. The nozzle forms a shoulder 5a on which an annular supporting device for the charge rests. The support device comprises three separate thin strips 6 fixed to a main flexible band 7 so as to be parallel to the axis of the charge. The flexible band 7 is positioned at a rear part of the strands 8 of propellant, the forward ends of the strands being held in position by a short auxiliary flexible band 9. Each of the two felxible bands 7, 9 consists of a woven core, based on glass fibre, which is coated on both its sides with a polyurethane resin, the whole having a thickness of 1 millimeter. The glue used to fix the strands of propellant on these bands is a polyurethane-based glue which is also used to glue the three strips 6 which are made of polyurethane, and have a thickness of 4 millimeters, to the inner surface of the shroud 4 of the propulsion device. The strands 8 are tubular and made of a two-component propellant without solvent. They have a length of 206 millimeters, the main flexible band 7 having a width of 80 millimeters and the auxiliary flexible band having a width of 20 millimeters.

It must be noted that the total amount of inhibitor used is less than the amount of inhibitor necessary in the construction of a "brush charge", and this is of value, on the one hand, in reducing the emission of smoke, and therefore rendering such a propulsion device less conspicuous, and on the other hand, in permitting a longer period of storage by reducing the ageing of the charge, which essentially arises from the migration of the nitroglycerine of the propellant into the inhibitor. Furthermore, such a pyrotechnic charge makes it possible to use inhibitors based on silicone resins, which are known for their inconspicuousness and their resistance to the migration of nitroglycerine. The thin strips 6 which constitute an annular supporting device are arranged at 120° and define gaps 10 between each other which allow the flow of combustion gases and make it possible to stabilise the pressure in the zones situated in front of and behind the supporting device. The lateral annular supporting device makes it possible to increase the inherent advantages of the charge; instead of strips the device can comprise two half-rings glued to the flexible band of the charge, these two half-rings preferably possessing a variable thickness in order to form gaps. Alternatively other forms of supporting device can be used, such as a device consisting of a front grid and a rear grid, or of metal pins arranged laterally on the charge.

FIG. 4 shows a pyrotechnic charge in the course of being wound into a spiral, the strands 11 of propellant having been glued to the flexible band 12 beforehand. The band, which has an initial thickness of 0.5 millimeter, is combustible, being made of ethylcellulose. The strands of two-component propellant are adhered to the band 12 by covering the band with a collodion formed by dissolving nitrocellulose in a solvent such as acetone.

Figure 6:
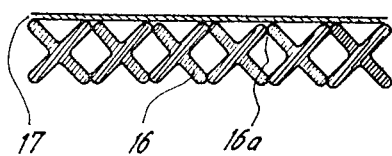
FIG. 6 is a partial cross-section showing another form of charge.
Figure 7:
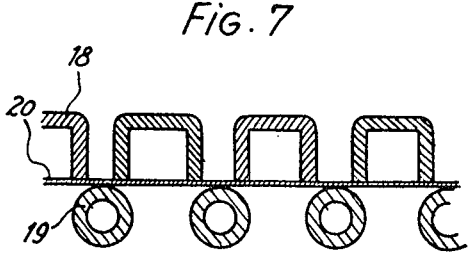
FIG. 7 is a partial cross-section showing a further charge in accordance with the invention.
Figure 15:
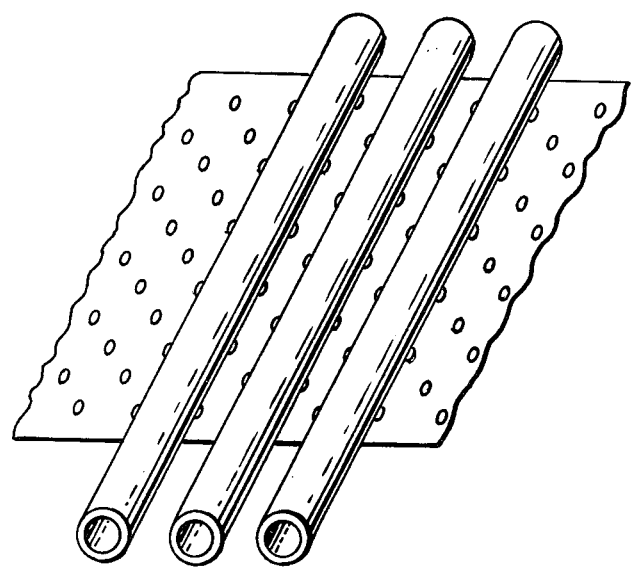
FIG. 15 illustrates the band with perforations.

FIGS 5 to 7 show different charges before being wound into spirals. In FIG. 5, the strands of propellant are thin strips 13, each having a width of 10 millimeters and a thickness of 1 millimeter. The strands are fixed at one edge to a main flexible band 14, an auxiliary flexible band 15 being glued to the opposite edges of the thin strips in order to fix their relative positions, especially during the winding of the flat intermediate charge. If the charge is wound with the main flexible band 14 innermost, the auxiliary band must be elastic, but if the auxiliary band 15 is innermost this band does not have to be elastic, since it concertinas and its contact with the main band 14 is discontinuous, when the spiral is formed. According to FIG. 6, the strands 16 of propellant are cruciform in cross-section, which has the advantage that it is possible to glue them to the flexible band 17 in contact with each other. Only the inner edges 16a of the strands remain in contact after winding the charge into a spiral with the flexible band 17 innermost. According to FIG. 7, strands of propellant 18 and 19 of different shapes are arranged on opposite sides of the flexible band 20, the strands 18 and 19 being in direct contact after winding the flat charge in the shape of a spiral.

According to other possible embodiments which are not shown, it is possible to produce a charge by winding into a spiral, two flat intermediate charges which have previously been arranged on top of each other and may or may not be fixed to each other.

The method of manufacturing charges in accordance with the invention comprises three main stages. For example, the pyrotechnic charge shown in FIGS. 1 and 2, can be produced by the following method. The tubular strands of two-component propellant without solvent are obtained by heat extrusion and laid out lengthwise. A template, comprising as many parallel grooves as there are strands, is used to position the strands. Two movable arms which are firmly fixed to the template grip the strands on the template which is turned over and placed on a constant level vat containing acetone, each strand of propellant dipping into the acetone to a height of 1 millimeter. The template is withdrawn from the vat and placed on a positioning assembly which holds a flexible band made of ethylcellulose, in a slightly stretched condition. The strands of propellant and the ethylcellulose band are glued together by simple contact under the weight of the template. After drying, the positioning assembly releases the flexible band, the template is replaced in its initial position and, after the free side of the flexible band has been brushed with a collodion comprising two-component propellant dissolved in acetone, the flat intermediate charge so formed, separated from the template, is wound in the shape of a spiral. Each tubular strand is thus glued, through two opposed generatrices, to the two adjacent turns of the flexible band.

Another method can be employed principally for the production of intermediate charges which are very long and which are subsequently cut to width and to length before being wound into spirals. The apparatus used in this method consists of a reel on which a very long flexible band, for example made of polyurethane, is wound, a brush supplied with polyurethane-based glue for coating the lower side of the flexible band as it is automatically unwound from the reel onto guide rollers. A very large number of tubes of propellant are arranged in a chute having a width which is slightly greater than the length of the tubes, this chute ending in a charging device which supplies a positioning drum equipped with slots parallel to its axis of rotation which is perpendicular to the flexible band, each slot receiving one tube of propellant. The rotating motion of the drum is governed by the speed of the band, in such a way as to control the distance of separation of the tubes of propellant. The drum is arranged beneath the flexible band so that the tubes of propellant are raised by the drum which positions the tubes and presses them onto the flexible band to which glue has been applied.

As the pyrotechnic charges according to the invention generate combustion gases which can flow towards both ends of the charge, such charges can be used not only in propulsion devices such as shown in FIG. 3, but also in the combustion chambers of the firing barrels of recoil-less guns.

The charges so far described have the strands of propellant secured to the flexible band by means of adhesive, but other ways of securing the strands of propellant to the flexible band can be used, for example as described below.

FIG. 8 shows, in part, two turns of a charge comprising tubular strands 21 of propellant which are individually fixed to a flexible band 24 by means of two clips situated towards the two ends of the strands. These clips are formed by two symmetrical protruberances in the form of tabs 22 and 23 punched out of the flexible band 24 which consists of a thin sheet of spring steel. The two strands of propellant situated to the right of FIG. 1 have been omitted, in order to show more clearly the shape of the tabs. In a central zone 25 the tabs have concave edges to define cylindrical sockets for receiving the strands of propellant. At their free ends 26 the edges of adjacent tabs diverge to form a guide to facilitate the insertion of the strands. As seen in FIG. 9 the band has three rows of tabs off-set by one pitch, the length of the cut-outs 27 corresponding to the length of the tabs 22 when opened out, and contributing to the flexibility of the metal band 24. Although the clips are described as being formed directly from the band by cutting and stamping, an identical configuration can be obtained by moulding a band made of plastics material, the thickness of the tabs being greater, however, which can make it necessary to machine slots in the strands of propellant so that, on the one hand, these tabs do not extend large distances beyond the external generatrices of these strands and do not hinder the flow of the gases, and on the other hand a stronger fixing is obtained. A similar configuration can also be obtained by joining clips onto a flexible band in the way similar to that described in the following example.

FIGS. 10 and 11 illustrate a charge comprising tubular strands 28, the cross-section of which has a square external profile. The strands are fixed to a woven flexible band 29 which is coated with silicone resin, by means of clips comprising small plates evenly arranged opposite each other on the two edges of the flexible band. The charge shown is intended to be placed in a combustion chamber equipped with a single nozzle, the flow of the combustion gases taking place in the direction from the upstream plate 30 towards the downstream small plate 31. The small plates are firmly fixed to the flexible band by means of the rivets 32 and 33. The strand of propellant is initially inserted into one of the lugs 34 of a downstream plate 31 and is then snapped into one of the lugs 35 of the upstream plate 30 which is made of an elastic material. The lower right-hand corner of FIG. 11 shows one of the upstream small plates which is equipped with two lugs 35a and 35b, the distance of separation of which corresponds to the pitch between adjacent strands of propellant. The lugs 34 of plates 31 are similarly spaced apart. The strands of propellant are removable, but the strands can be permanently fixed to the flexible band by making the lugs 35 of the upstream small plates similar to those of the downstream plates, but not bending over the lugs into the strands of propellant until the strands of propellant have been placed in position.

FIG. 12 shows a tubular strand 36 of propellant which is attached to a flexible band 37 by means of two tubular aluminium rivets 38, only one of which is shown. The inner end 39 inside the strand is rivetted after the strand has been placed in position. In an alternative embodiment, which is not shown, a pin made of a plastics material passes through a transverse perforation of the strand of propellant and has a larger conical head which is split axially and snaps into the perforation of the strand. Alternatively a self-tapping screw can be used when the strand of propellant is sufficiently thick to secure it to the flexible band.

FIG. 13 shows a strand of propellant 40 having a U-shaped cross-section, the actual thickness of which is 0.3 millimeter and the flat base of which is fixed directly to the flexible band 41 by means of two fasteners 42 which pass through the strand of propellant and the flexible band, like a staple. FIG. 14 shows a tubular strand 43 of propellant which is fixed to the flexible band 44 by means of two fasteners 45 of U-shaped configuration adapted to conform to the shape of the strand. The fasteners press the strand onto the band 44, the ends of the fasteners being passed through the band and bent over. The band 44 has perforations 46 which make it possible to balance the pressures prevailing in the various cavities formed within the turns of the charge.

In all the described embodiments each strand of propellant contacts the flexible band or bands to which it is fixed over a minor portion of its total periphery.

What is claimed is:

1. A pyrotechnic charge located in a chamber for use in the propulsion of an engine, comprising at least one band of flexible material wound in several spiral turns about a central axis, elongate strands of propellant fixed to said flexible band, said strands having a length and said band having a width less than said length of the strands of propellant, each said strand of propellant extending in a plane containing said central axis, and being positioned radially of said axis directly between two adjacent said turns of said flexible material, wherein each of the strands of propellant is fixed to said flexible band by adhesive and said strands of propellant have at least one concave surface, said flexible band in intermediate between the two ends of the propellant, said band being provided with supporting means, said band being the sole support for the strands in said chamber.

2. A pyrotechnic charge according to claim 1, wherein said strands of propellant are fixed to a single said flexible band in a common section transverse to said central axis.

3. A pyrotechnic charge according to claim 2, wherein said band has two sides and said strands of propellant are fixed to both sides of said flexible band.

4. The pyrotechnic charge according to claim 3, wherein the strands which are fixed to both sides of the flexible band are of different shape.

5. A pyrotechnic charge according to claim 1, wherein said strands of propellant are fixed to two said flexible bands, said bands being in contact with each other.

6. A pyrotechnic charge according to claim 1, each said flexible band having two sides and wherein said strands of propellant are fixed to only one of said two sides of each flexible band.

7. The pyrotechnic charge according to claim 6, wherein the strands are cruciform in cross section.

8. A pyrotechnic charge according to claim 1, wherein said flexible band has an inhibiting nature as regards the combustion characteristics of said strands of propellant.

9. A pyrotechnic charge according to claim 1, wherein each flexible band is placed in the central zone of the strands of propellant and said strands of propellant project beyond the edges of the said band.

10. A pyrotechnic charge according to claim 1, wherein said strands of propellant form tubes of same external diameter but different internal diameter and have at least two different combustion thicknesses.

11. A pyrotechnic charge according to claim 1, wherein said flexible band has an end portion at the center of the charge and said strands of propellant are evenly distributed on said flexible band except at said end portion thereof.

12. A pyrotechnic charge according to claim 1, comprising a simple spiral formed by winding a single layer of said strands of propellant fixed to said flexible band.

13. A pyrotechnic charge according to claim 1, wherein said flexible band has an outer turn extending around the charge, and lateral annular supporting means fixed to said outer turn, are provided.

14. A pyrotechnic charge according to claim 13, wherein said supporting means comprises two half-rings glued to the flexible band.

15. A pyrotechnic charge according to claim 13, wherein said supporting means comprises separate strips fixed to said outer turn of the flexible band, and parallel to said central axis.

16. A charge according to claim 1, wherein said band is provided with perforations for balancing the pressures.

17. A charge according to claim 1, wherein said charge is tubular.

18. A charge assembly for making a pyrotechnic charge as claimed in claim 1, comprising flexible band means and elongate strands of propellant fixed to said band means, said strand of propellant being parallel.

19. A method of manufacturing a pyrotechnic charge for use in the propulsion of an engine in accordance with claim 1, comprising the steps of: positioning elongate strands having at least one concave surface of propellant to extend parallel to each other; fixing said relatively positioned strands of propellant to a band of flexible material by means of an adhesive; winding into a spiral having several turns said flexible band with said parallel strands of propellant fixed thereto and placing said charge in said engine.

20. A method according to claim 19, wherein said positioning of the strands is carried out by means of a plate provided with parallel strand receiving parts.

21. A method according to claim 19, wherein tubes of propellant are used and the positioning of the tubes is carried out by means of a drum provided with strand receiving slots parallel to the axis of rotation of the drum, which axis is perpendicular to said band of flexible material, each slot receiving one tube of propellant.

22. The pyrotechnic charge according to claim 1, wherein said band has a thickness between 0.5 and 4 mm.

* * * * *